(12) United States Patent
De Block

(10) Patent No.: US 9,266,504 B2
(45) Date of Patent: Feb. 23, 2016

(54) WIPER BLADE AND END CAP

(75) Inventor: Peter De Block, Halen (BE)

(73) Assignee: Robert Bosch GmbH, Stuttgart (DE)

( * ) Notice: Subject to any disclaimer, the term of this patent is extended or adjusted under 35 U.S.C. 154(b) by 252 days.

(21) Appl. No.: 14/000,890

(22) PCT Filed: Jan. 9, 2012

(86) PCT No.: PCT/EP2012/050227
§ 371 (c)(1),
(2), (4) Date: Aug. 22, 2013

(87) PCT Pub. No.: WO2012/113586
PCT Pub. Date: Aug. 30, 2012

(65) Prior Publication Data
US 2013/0326837 A1 Dec. 12, 2013

(30) Foreign Application Priority Data
Feb. 22, 2011 (DE) ...................... 20 2011 003 000 U

(51) Int. Cl.
*B60S 1/38* (2006.01)

(52) U.S. Cl.
CPC ............. *B60S 1/3848* (2013.01); *B60S 1/3886* (2013.01); *B60S 1/3889* (2013.01); *B60S 1/381* (2013.01); *B60S 1/3879* (2013.01); *B60S 1/3894* (2013.01); *B60S 2001/3836* (2013.01)

(58) Field of Classification Search
CPC .... B60S 1/3848; B60S 1/3886; B60S 1/3887; B60S 1/3889; B60S 1/3893; B60S 1/3891; B60S 1/3894
USPC .......... 15/250.452, 250.453, 250.454, 250.43
See application file for complete search history.

(56) References Cited

U.S. PATENT DOCUMENTS

2007/0240271 A1 10/2007 Wilms et al.
2009/0013492 A1* 1/2009 Henin ...................... 15/250.452
2009/0064440 A1 3/2009 Boland
2010/0139026 A1 6/2010 Ku

FOREIGN PATENT DOCUMENTS

CN 101111414 1/2008
CN 201116096 9/2008
(Continued)

OTHER PUBLICATIONS

International Search Report for Application No. PCT/EP2012/050227 dated Mar. 13, 2012 (3 pages).

*Primary Examiner* — Gary Graham
(74) *Attorney, Agent, or Firm* — Michael Best & Friedrich LLP

(57) ABSTRACT

The invention relates to a wiper blade (10) in a flat bar construction, having a rubber-elastic wiper strip (14), in the lateral longitudinal grooves (24) of which two band-shaped spring rails (28) which extend next to each other in a parallel manner and which are bent concavely toward a wiper lip (16) are inserted as support elements which protrude laterally out of the longitudinal grooves (24), and which are held together and attached to each other at the ends thereof by end caps (36) which, on the longitudinal sides thereof, have guide profiles (44) having a u-shaped cross section, the side jaws (46, 48, 60) of which are guided on the portions of the associated spring rail (28), which protrude out of the longitudinal grooves (24), wherein the end caps (36) comprise spring tongues having engagement lugs (50, 62) which engage in recesses (30) of the spring rails (28) and attach same in the assembly direction (52). According to the invention, one of the side jaws (46, 48, 60) of each guide profile (44) is designed to be at least partially elastic and is used as spring tongue, and the engagement lug (50, 62) is molded on the yielding portion of the side jaw (46, 48, 60), wherein the height of said engagement lug decreases in the assembly direction (52) and thus forms a striking bevel (54), while the engagement lug (50, 62) drops off steeply in the opposite direction.

3 Claims, 4 Drawing Sheets

(56) References Cited

FOREIGN PATENT DOCUMENTS

| CN | 201169250 | 12/2008 |
|---|---|---|
| CN | 101456407 | 6/2009 |
| CN | 101857009 | 10/2010 |
| CN | 101877801 | 11/2010 |
| DE | 202004012109 | 9/2004 |
| DE | 102004051466 | 12/2005 |
| EP | 2103490 | 9/2009 |

* cited by examiner

WIPER BLADE AND END CAP

BACKGROUND OF THE INVENTION

The invention relates to a wiper blade.

A generic wiper blade is known from the German patent application DE 10 2004 051 466 A1. Said wiper blade comprises a wiper strip which is made from an elastomer material and which rests with a wiper lip against a window pane of a motor vehicle. In order to enable the wiper strip to follow the curvature of the vehicle's window pane, two band-shaped spring rails which extend next to each other in a parallel manner and which are bent concavely toward a wiper lip are inserted as support elements in lateral longitudinal grooves of the wiper strip. Said spring rails protrude laterally out of the longitudinal grooves and are held together and attached to each other at the ends thereof by end caps. The end caps have respectively two guide profiles on the longitudinal sides thereof, said guide profiles extending parallel to the longitudinal direction of the wiper strip and comprising guide surfaces and webs. The guide surfaces guide the end caps along the portions of the spring rails that protrude out of the longitudinal grooves.

Each end cap comprises at least one spring tongue that is integrally formed thereon and extends substantially parallel to the upper side of the head strip. The spring tongue comprises a locking lug on the side thereof oriented towards the head strip. Said locking lug is of wedge-shaped design and increases in the height thereof towards the end of the wiper blade; thus facilitating the assembly of the end cap. When the spring tongue executes a pivotal motion, the flank of the wedge-shaped locking lug that faces the end becomes increasingly erect; and therefore the end cap is secured against detaching from the wiper strip. In order that the locking lug cannot accidently release, a locking bolt is provided which is guided in a recess of the end cap and presses the spring tongue against the head strip of the wiper strip and blocks the same in the locking position.

In addition to the locking lug, the spring tongue can comprise two latching pins which are disposed laterally and symmetrically with respect to the locking lug. In the assembled state, said latching pins engage in latching holes which are disposed in the end region of the spring rails and serve as an additional guide. Whereas the latching pins are cylindrically designed, the latching holes are configured as slotted holes so that the spring rails have limited play in the longitudinal direction. In addition, the latching pins determine the distance of the spring rails from one another. In so doing, the web of the wiper strip has sufficient clearance between the spring rails for reliable functionality.

SUMMARY OF THE INVENTION

According to the invention, the engagement lugs are provided on the side jaws of the guide profile which are more remote from the wiper lip, whereas the other side jaws of the guide profile cover said engagement lugs in the direction of the end wall of the end cap and terminate before said end wall. Because the side jaws, which are closest to the wiper lip, are not integrally formed on the end wall, said jaws are to a large extent resilient; and therefore both side jaws of a guide profile yield during assembly, whereby overall a large spring deflection results without the material being overstressed. The side jaws of the guide profiles can nevertheless be embodied sufficiently rigid so that it is not necessary to secure the engagement lugs in the engagement position by means of a locking bolt.

The engagement lugs can be provided either on the side jaws of the guide profile which are more remote from the wiper lip or on the side jaws of the wiper lip nearest to the wiper lip. The latter alternative is more favorable because the side jaw nearer to the wiper lip can be more easily modified for the additional task as a spring tongue. Moreover, the engagement lug in the latter alternative is easier to reach with a tool and the engagement position thereof is easier to release when the end cap is being disassembled.

According to one embodiment of the invention, which relates to a disposal of the engagement lug on the side jaw more remote from the wiper lip, the other side jaw at the end of the associated spring rail terminates before the highest protrusion of the engagement lug; thus enabling a gap to be formed through which said engagement lug can be manipulated from the outside. The option also exists for the side jaw nearest to the wiper lip to cover said engagement lug towards said wiper lip in the assembled position; thus enabling said engagement lug and the opening in the spring rail to be protected from contamination and air flow noises in this region to be reduced.

The height of the engagement lug expediently decreases in the assembly direction. Said engagement lug thus forms a striking bevel. The engagement lug drops off steeply in the opposite direction, whereby the locking effect is enhanced. According to a further embodiment, it is proposed that the recesses in the spring rails are designed symmetrically to the longitudinal median plane of the respective spring rail. It is thereby ensured that the spring rails are identical on both sides of the wiper blade and the number of different parts are held to a minimum.

The invention relates to a wiper blade comprising an end cap as well as to the end cap as an individual part which can be used in connection with the inventive wiper blade. The end cap is characterized by the fact that side jaws of each guide profile are designed to be at least partially elastic and are used as spring tongues, and the side jaws facing the wiper lip terminate before the end wall of the end cap, wherein the height of said side jaws decreases in the assembly direction and thus forms a striking bevel, while the engagement lug drops off steeply in the opposite direction. In this connection, it is expedient for the extension of the engagement lug to be greater in the assembly direction than transversely thereto. A spring rail comprising a corresponding slotted hole as recess is suited to this end, wherein a suitable amount of play between the engagement lug and the recess can be provided to improve functionality.

BRIEF DESCRIPTION OF THE DRAWINGS

Further advantages ensue from the following description of the drawings. In the drawings, exemplary embodiments of the invention are depicted. The drawings, the description and the claims contain numerous features in combination. The person skilled in the art will also advantageously consider the features individually and put them together to form further useful combinations.

In the drawings.

DETAILED DESCRIPTION

Figure 1:
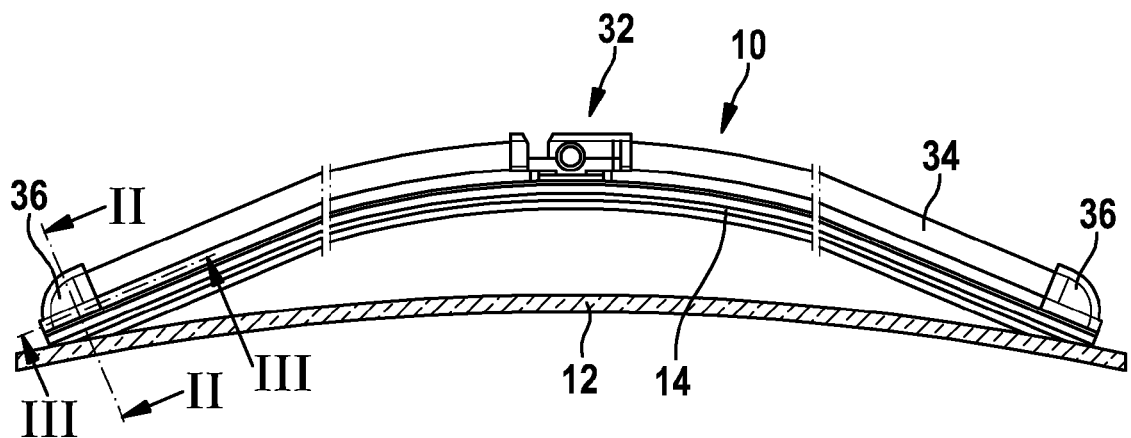
FIG. 1 shows a side view of a wiper blade according to the invention.
Figure 2:
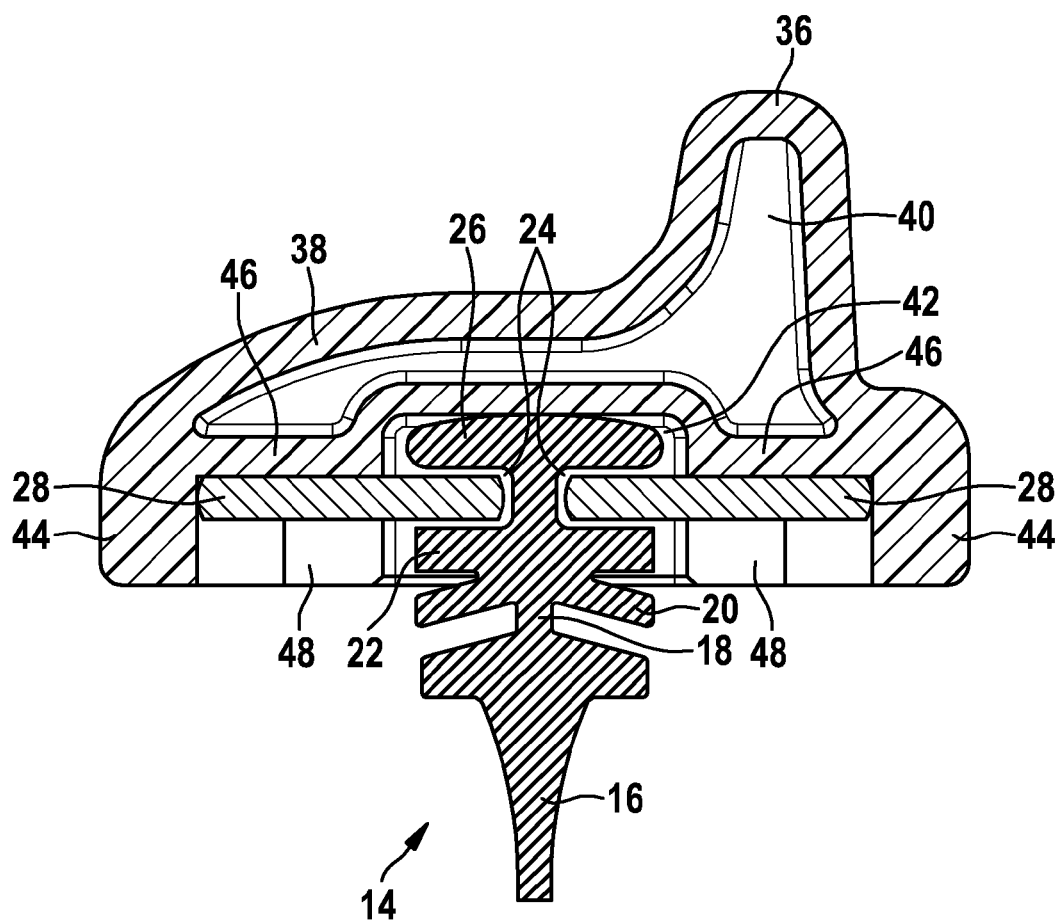
FIG. 2 shows a section corresponding to the line 11-11 in FIG. 1.

A wiper blade in a flat bar construction has a wiper strip 14, the wiper lip 16 of which is fastened to a head strip 22 via a rocker web 22. Support bars 20 are laterally disposed between the wiper lip 16 and the head strip 22. In addition, lateral longitudinal grooves 24 are provided in the head strip 22, which form a web 25 between themselves. The part of the head strip 22 facing away from the wiper lip 16 is referred to as the back strip 26.

A spring rail 28, which protrudes laterally to some extent, is inserted in the longitudinal grooves 24 on each side of the wiper blade 10. On the protruding portion of the spring rail 28, a spoiler 34 is guided in the longitudinal direction on both sides of an attachment element 32 for the articulated connection to a non-depicted wiper arm. The spoiler 34 is optional and can be omitted in certain applications. End caps 36 are provided on the ends of the wiper blade 10. Said end caps comprise guide profiles 44 on the longitudinal sides thereof and are guided therewith on the portions of the spring rails 28 protruding from the grooves 24. The band-shaped spring rails 28 lie thereby between the side jaws 46 and 48 of the guide profiles 44. The side jaws 46 on the side facing away from the wiper lip 16 can be connected to an intermediate wall which forms a recess 42 for the back strip 26 of the wiper strip 14. If the wiper blade 10 comprises a spoiler 34, the end caps 36 also comprise flow profiles 28 and have recesses 40 available for attaching to the spoiler 34.

In order that the wiper blade 10 can follow a curved vehicle window pane 12, the spring rails 28 are bent concavely toward the wiper lip 16 so that only the ends of the wiper blade 10 touch the vehicle window pane 12 in the unloaded state (FIG. 1).

In order that identical spring rails can be used on both sides of the wiper blade 10, it is advantageous for the recesses 30 of the spring rails 28 to be designed symmetrically to a longitudinal median plane 64 of the associated spring rail. It can thereby be expedient for the portion of the spring rail 68 which dips into the longitudinal groove 24 of the wiper strip 14 to be narrower than the protruding portion.

Figure 3:
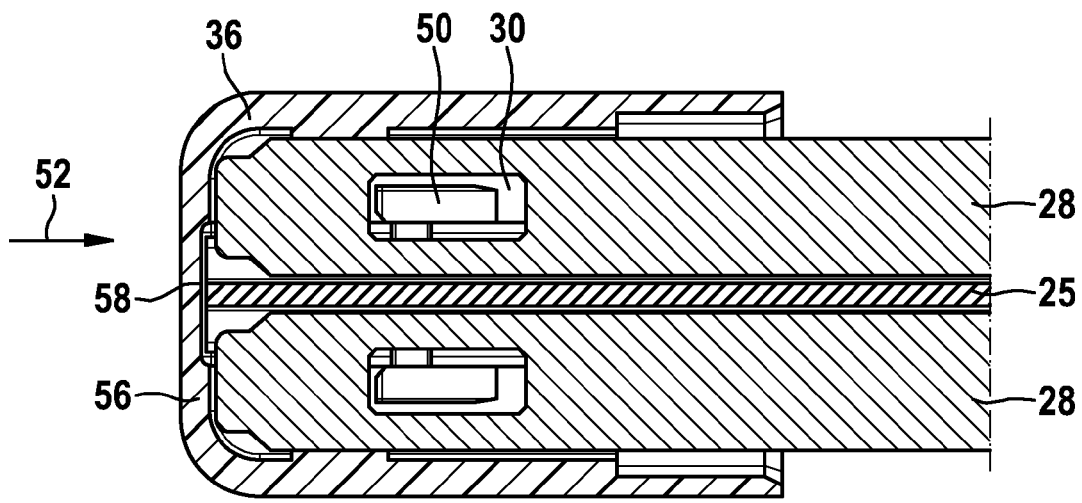
FIG. 3 shows a section corresponding to the line 111-111 in FIG. 1.
Figure 4:
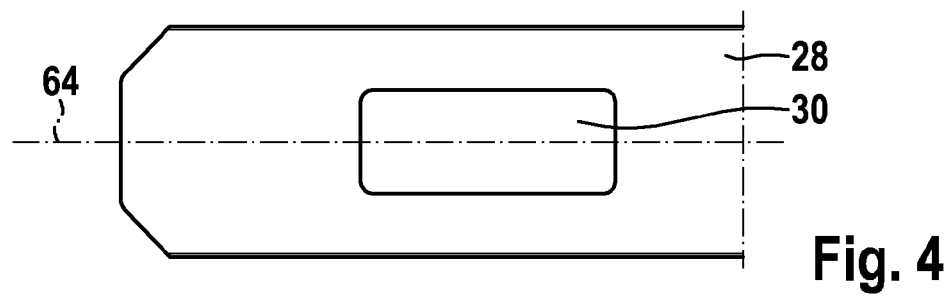
FIG. 4 shows a top view of an end of a spring rail.
Figure 5:
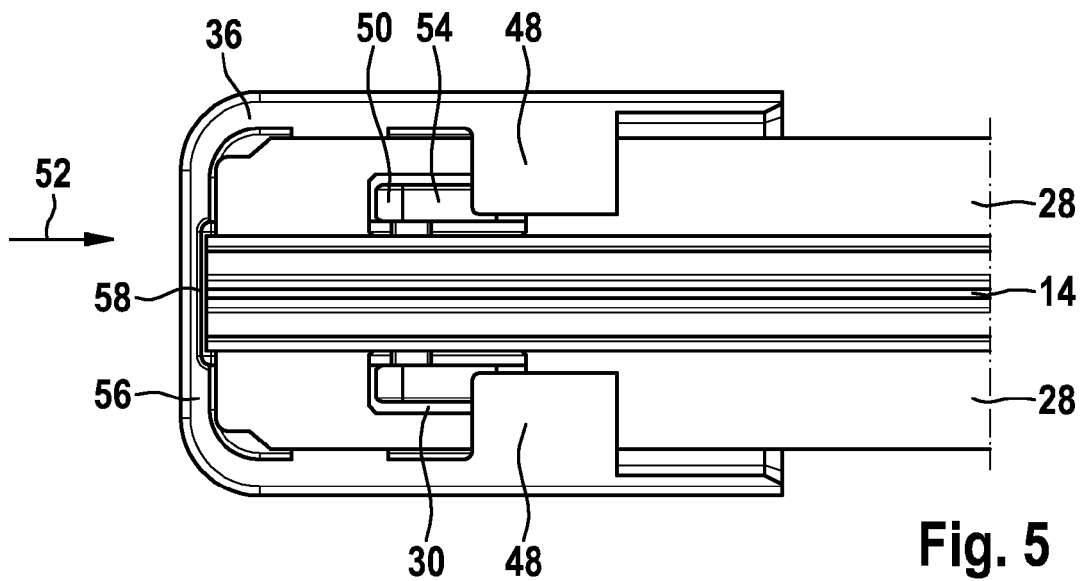
FIG. 5 shows a view of an end of a wiper blade pursuant to FIG. 1 from below.
Figure 6:
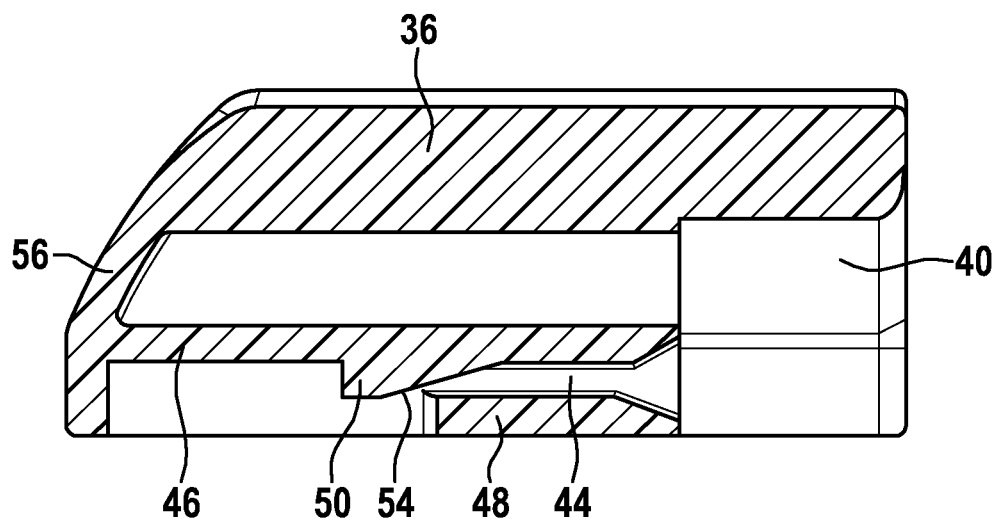
FIG. 6 shows a longitudinal section of an end cap.

As can be seen in FIGS. 3 and 5, the spring rails 28 are fixed in the longitudinal direction between the engagement lugs 50, which engage in the recesses 30 of the spring rails, and the inner surface of the terminal end wall 56 of the end cap 36. In order that distinct contact surfaces result between the end faces of the spring rails 28 and the inner surface of the end wall 56 of the end cap 36, the corners of said spring rails 28 are broken, whereby a sufficient clearance is formed in the corners. In addition, an indentation 58 for the head strip 22 of the wiper strip 14 is provided on the inner surface of the end wall 56.

When assembling the end cap 36, said end cap is pushed in the assembly direction 52 with the guide profiles 44 thereof onto the spring rails 28, wherein the guide profiles 44 widen due to the elastic design of the side jaw 46 until the engagement lugs 50, 62 can engage in the recesses 30 of the spring rails 28. In the engaged state of the engagement lug 50, the end of the side jaw 48 which faces the end wall 56 and is nearest to the wiper lip 16 is located in the region of the striking bevels 54 so that the engagement lug 56 is only partially covered and can be manipulated from this side through the gap between the side jaw 48 and the end wall 56.

Figure 7:
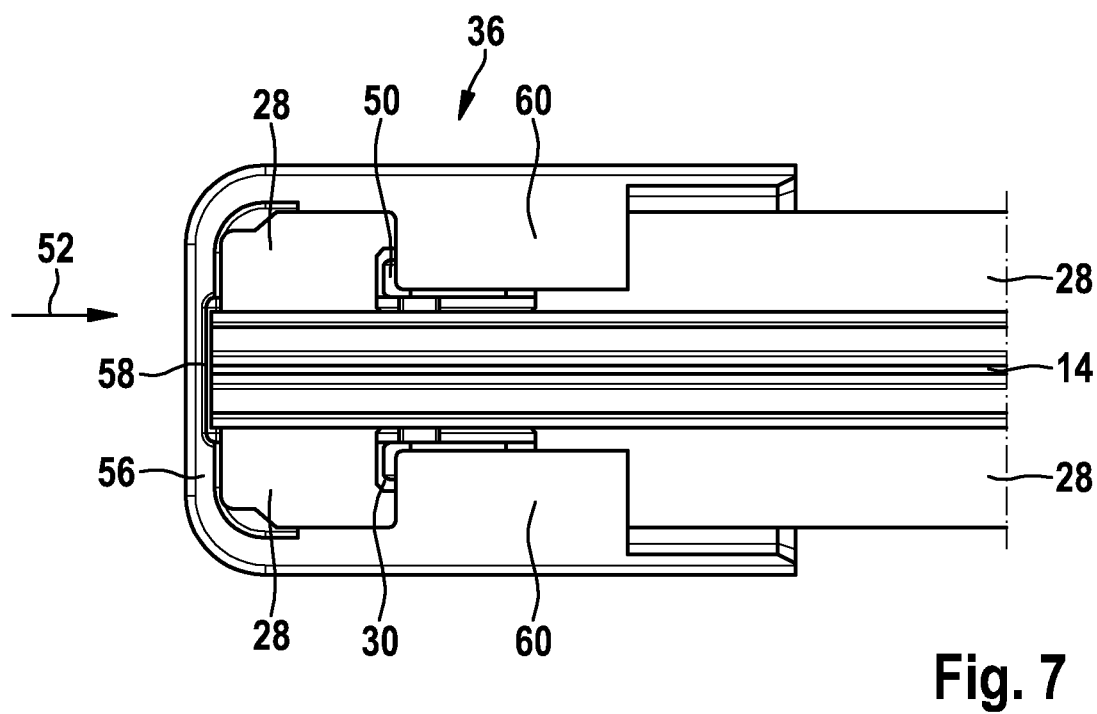
FIG. 7 shows a variant of FIG. 5.
Figure 8:
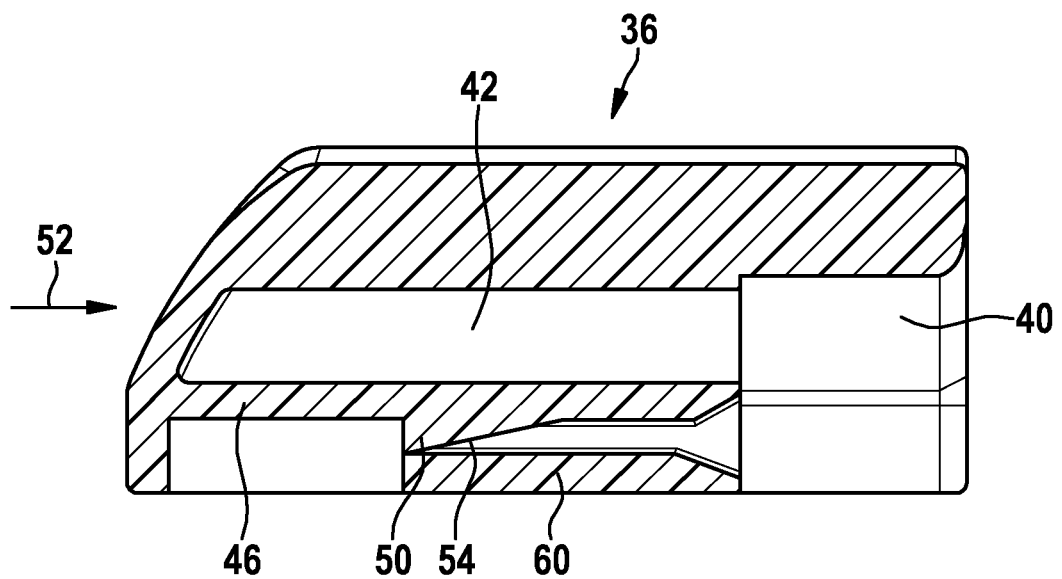
FIG. 8 and FIG. 9 show variants of FIG. 6.

In the embodiment pursuant to FIG. 7, the side jaws 60 of the guide profiles 44 which are nearest to the wiper lip 16 are designed longer; and therefore in the engaged position, said side jaws cover the engagement lugs 56, 62 in the direction of the wiper lip 16 but terminate before the end wall 56. The engagement lugs 58, 62 and the recesses 30 are therefore protected against contamination. FIG. 8 shows a corresponding longitudinal section of an end cap 36 in the embodiment pursuant to FIG. 7.

Figure 9:
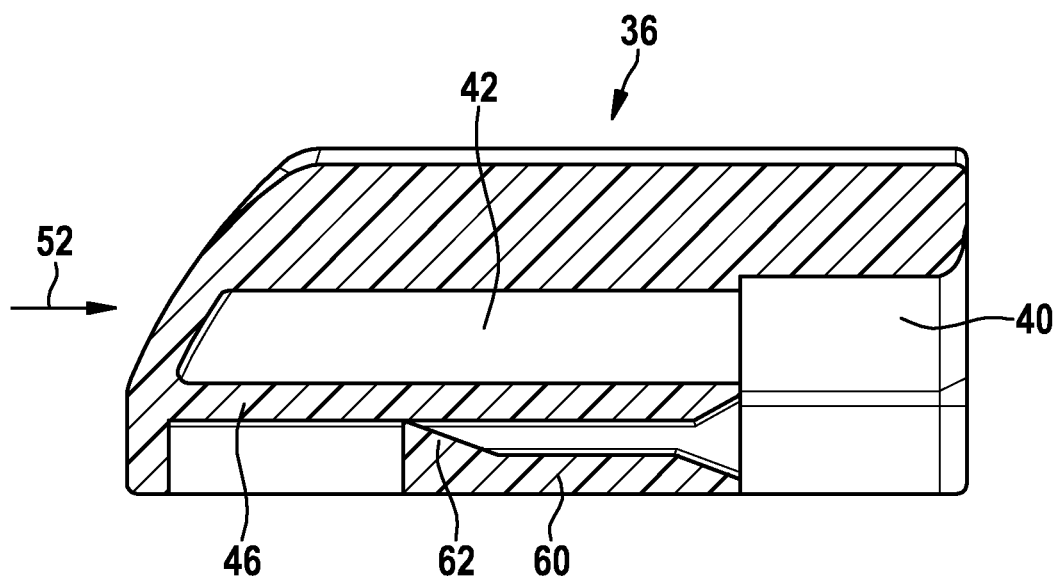

The embodiment pursuant to FIG. 9 is different from the previously described embodiments particularly by virtue of the fact that the engagement lug 62 is integrally formed on the lower side jaw 60 of the guide profile 44 and engages in the recess 30 of the spring rail 28 from the side facing the wiper lip 16.

The invention claimed is:

1. A wiper blade (10) in a flat bar construction, having a rubber-elastic wiper strip (14), in longitudinal grooves (24) of which two band-shaped spring rails (28) which extend next to each other in a parallel manner and are bent concavely toward a wiper lip (16) are inserted as support elements which protrude laterally out of the longitudinal grooves (24), and which are held together and attached to each other at ends thereof by end caps (36) which, on longitudinal sides thereof, have guide profiles (44) having a u-shaped cross section, side jaws (46, 48, 60) of which are guided on portions of the associated spring rail (28), which protrude out of the longitudinal grooves (24), wherein one of the side jaws (46, 48, 60) of each guide profile (44) is at least partially elastic and comprises an engagement lug (50, 62) which engages in a recess (30) of the associated spring rail (28) and fixes the spring rail in an assembly direction (52), wherein the engagement lugs (50) are provided on side jaws (46) of the guide profile (44) which are more remote from the wiper lip (16), while other side jaws (60) of the guide profile (44) cover said engagement lugs (50) toward an end wall (56) of the end cap (36) and terminate before said end wall, and wherein the side jaws (48) of the guide profile (44) nearest to the wiper lip (16) terminate at ends thereof facing the end wall (56) of the end cap (36) before a highest protrusion of the engagement lugs (50); thus enabling the engagement lugs (50) to at least partially traverse said side jaws (48).

2. The wiper blade (10) according to claim 1, characterized in that a height of the engagement lug (50, 62) decreases in the assembly direction (52) and thus forms a striking bevel (54), while the engagement lug (50, 62) drops off steeply in an opposite direction.

3. The wiper blade (10) according to claim 1, characterized in that recesses (30) in the spring rails (28) are arranged symmetrically to a longitudinal median plane (64) of the respective spring rails (28).

* * * * *